(12) United States Patent
Masalkar et al.

(10) Patent No.: US 9,456,201 B2
(45) Date of Patent: Sep. 27, 2016

(54) VCSEL ARRAY FOR A DEPTH CAMERA

(71) Applicant: MICROSOFT TECHNOLOGY LICENSING, LLC, Redmond, WA (US)

(72) Inventors: Prafulla Masalkar, Issaquah, WA (US); Marshall T. DePue, Redmond, WA (US); Zhaoming Zhu, Redmond, WA (US); Sridhar Canumalla, Sammamish, WA (US); Eric Paul Filer, Renton, WA (US); Blair Madison Kent, Snohomish, WA (US); John W. Mensonides, Mukilteo, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 361 days.

(21) Appl. No.: 14/177,157

(22) Filed: Feb. 10, 2014

(65) Prior Publication Data

US 2015/0229912 A1    Aug. 13, 2015

(51) Int. Cl.
| | |
|---|---|
| *H04N 13/02* | (2006.01) |
| *H04N 5/225* | (2006.01) |
| *G01S 17/89* | (2006.01) |
| *G01S 7/481* | (2006.01) |

(52) U.S. Cl.
CPC .......... *H04N 13/0253* (2013.01); *G01S 7/481* (2013.01); *G01S 17/89* (2013.01); *H04N 5/2254* (2013.01); *H04N 13/0296* (2013.01)

(58) Field of Classification Search
CPC .......... H04N 13/0253; H04N 5/2254; H04N 13/0296; G01S 17/89; G01S 7/481
See application file for complete search history.

(56) References Cited

U.S. PATENT DOCUMENTS

| | | | |
|---|---|---|---|
| 3,694,902 | A | 10/1972 | Apgar et al. |
| 4,752,109 | A | 6/1988 | Gordon et al. |

(Continued)

FOREIGN PATENT DOCUMENTS

| | | |
|---|---|---|
| EP | 2610978 A2 | 7/2013 |
| FR | 2106074 A5 | 4/1972 |

(Continued)

OTHER PUBLICATIONS

IPEA European Patent Office, International Preliminary Report on Patentability Issued in Application No. PCT/US2015/014343, Dec. 23, 2015, WIPO, 7 pages.

(Continued)

*Primary Examiner* — Tung Vo
(74) *Attorney, Agent, or Firm* — Gregg Wisdom; Judy Yee; Micky Minhas

(57) ABSTRACT

Various embodiments relating to a time-of-flight (TOF) depth camera including a vertical-cavity surface emitting laser (VCSEL) array device are disclosed. In one embodiment, a TOF depth camera includes a heat sink having a mounting surface, an illumination module mounted to the mounting surface, and an image sensor mounted to the mounting surface. The illumination module includes a printed circuit board (PCB), a VCSEL array device configured to generate illumination light to illuminate an image environment, and a driver configured to deliver an operating current to the VCSEL array device. The VCSEL array device and the driver are mounted to the PCB. The image sensor is configured to detect at least a portion of illumination light reflected from the image environment.

13 Claims, 5 Drawing Sheets

(56) References Cited

U.S. PATENT DOCUMENTS

| | | | |
|---|---|---|---|
| 4,901,324 | A | 2/1990 | Martin |
| 6,285,476 | B1 | 9/2001 | Carlson et al. |
| 6,469,381 | B1 | 10/2002 | Houle et al. |
| 7,158,549 | B2 | 1/2007 | Ayliffe |
| 7,235,880 | B2 | 6/2007 | Prokofiev |
| 8,034,645 | B2 | 10/2011 | Lin et al. |
| 8,188,488 | B2 | 5/2012 | Andrews et al. |
| 8,199,787 | B2 | 6/2012 | Deri et al. |
| 8,201,968 | B2 | 6/2012 | Maxik et al. |
| 8,254,422 | B2 | 8/2012 | Datta et al. |
| 8,320,621 | B2 | 11/2012 | McEldowney |
| 9,072,533 | B2 | 7/2015 | Liu et al. |
| 2002/0030445 | A1 | 3/2002 | Fukasawa |
| 2002/0100912 | A1 | 8/2002 | Ishiguro et al. |
| 2003/0159844 | A1 | 8/2003 | Wolf et al. |
| 2004/0031272 | A1 | 2/2004 | Mecherle et al. |
| 2004/0136099 | A1 | 7/2004 | Kim et al. |
| 2006/0018098 | A1 | 1/2006 | Hill et al. |
| 2006/0088254 | A1 | 4/2006 | Mohammed |
| 2007/0158799 | A1 | 7/2007 | Chiu et al. |
| 2009/0086455 | A1 | 4/2009 | Sakamoto et al. |
| 2009/0116251 | A1 | 5/2009 | Harbers et al. |
| 2010/0096643 | A1 | 4/2010 | Cao |
| 2011/0019416 | A1 | 1/2011 | Poissonnet et al. |
| 2011/0044367 | A1* | 2/2011 | Budd .................. G02B 6/4201 372/50.21 |
| 2012/0044790 | A1 | 2/2012 | Shimazawa et al. |
| 2012/0050991 | A1 | 3/2012 | Tamanuki |
| 2012/0153340 | A1 | 6/2012 | Song et al. |
| 2012/0287958 | A1 | 11/2012 | Lell et al. |
| 2012/0293625 | A1 | 11/2012 | Schneider et al. |
| 2013/0022069 | A1 | 1/2013 | Lee et al. |
| 2013/0030423 | A1* | 1/2013 | Reichert .............. A61N 5/0616 606/9 |
| 2013/0208753 | A1 | 8/2013 | van Leeuwen et al. |
| 2013/0272330 | A1 | 10/2013 | Joseph et al. |
| 2013/0342701 | A1* | 12/2013 | Meir ........................ H04N 5/33 348/164 |
| 2014/0128744 | A1* | 5/2014 | Cuccia .................. A61B 5/0064 600/476 |
| 2014/0200636 | A1* | 7/2014 | Reichert ............. H01S 5/02476 607/89 |
| 2015/0130903 | A1* | 5/2015 | Thompson ......... H04N 13/0253 348/46 |

FOREIGN PATENT DOCUMENTS

| | | |
|---|---|---|
| JP | 11185273 | 7/1999 |
| WO | 2012015724 A1 | 2/2012 |
| WO | 2012154510 A3 | 11/2012 |

OTHER PUBLICATIONS

European Patent Office, International Preliminary Report on Patentability of PCT/US2014/013467, Jan. 26, 2015, 16 pages.

"3DV Systems: ZCam—Depth Camera", Optoelectronic Notes, http://ntuzhchen.blogspot.tw/2011/04/3dv-systems-zcam-depth-camera.html, Apr. 6, 2011, 5 pages.

Bovatsek, Jim et al., "Ultraviolet Lasers: UV Lasers Improve PCB Manufacturing Processes", LaserFocusWorld, International Resource for Technology and Applications in the Global Photonics Industry, http://www.laserfocusworld.com/articles/print/volume-48/issue-11/features/uv-lasers-improve-pcb-manufacturing-processes.html, Nov. 1, 2012, 6 pages.

Colaco, Andrea et al., "3dim: Compact and Low Power Time-of-Flight Sensor for 3D Capture Using Parametric Signal Processing", MIT, http://www.rle.mit.edu/stir/documents/ColacoKGMWG_IISW2013.pdf, Jun. 15, 2013, 4 pages.

Jiang, Guosheng et al., "Understanding of Laser, Laser Diodes, Laser Diode Packaging and Its Relationship to Tungsten Copper", Proceedings of Advanced Thermal Management Materials, http://www.torreyhillstech.com/Documents/Laser_package_white_paper.pdf, Sep. 7, 2012, 18 pages.

Mercado, Emmanuel, "Low-Temperature Characterization of a 1.55-um Multiple-Quantum-Well Laser Down to 10 K", In Thesis of Master of Science Optical Science and Engineering, University of New Mexico, http://repository.unm.edu/bitstream/handle/1928/23201/REVISED%20FINAL.pdf?sequence=1, May 2013, 91 pages.

"Optical Components", Finisar, http://www.finisar.com/products/optical-components/High-Powered-VCSELs/HVS7000-001, Available as early as Feb. 24, 2013, 1 pages.

Pritsch, Benedikt et al., "High-Power IR Laser in SMT Package", Proceedings of the SPIE 2009, vol. 7198, International Society for Optics and Photonics, http://144.206.159.178/ft/CONF/16426345/16426360.pdf, Feb. 23, 2009, 9 pages.

"Processing and Characterization of Module to Heatspreader Interface", http://scholar.lib.vt.edu/theses/available/etd-0107100-102125/unrestricted/ch4.pdf, Jul. 21, 2003, 38 pages.

Seurin, Jean-Francois et al., "Efficient Vertical-Cavity Surface-Emitting Lasers for Infrared Illumination Applications", Proceedings of the SPIE the International Society for Optical Engineering, http://www.princetonoptronics.com/pdfs/7952-15.pdf, Feb. 13, 2011, 10 pages.

ISA European Patent Office, International Search Report and Written Opinion for International Patent Application No. PCT/US2014/013467, Apr. 28, 2014, 14 pages.

Johnson, Lawrence A., "Controlling Temperatures of Diode Lasers Thermoelectrically", http://assets.newport.com/webDocuments-EN/images/AN01_Control_Temp_Laser_Diode_IX.PDF, Available as early as Apr. 1988, 11 pages.

Canumalla, Sridhar, "Thermal Management in Laser Diode Device", U.S. Appl. No. 13/758,804, filed Feb. 4, 2013, 27 pages.

"Laser Cooling for TO Packages Using Embedded Thin-Film Thermoelectric Coolers", Nextreme Thermal Solutions, Inc., http://www.nextreme.com/media/pdf/Nextreme_Laser_Diode_Cooling_Test_Report_Jan10.pdf, Jan. 2010, 8 pages.

"Thermoelectric Cooling Systems Design Guide", Marlow Industries, Inc., http://www.marlow.com/media/marlow/images/Downloads/TEC%20Design%20Guide.pdf, Available as early as Jan. 1994, 21 pages.

ISA European Patent Office, International Search Report and Written Opinion Issued in Application No. PCT/US2015/037556, Aug. 13, 2015, WIPO, 11 pages.

ISA European Patent Office, International Search Report and Written Opinion Issued in Application No. PCT/US2015/014343, Sep. 22, 2015, WIPO, 15 pages.

IPEA European Patent Office, Second Written Opinion issued in PCT Application No. PCT/US2015/037556, May 12, 2016, WIPO, 5 pages.

\* cited by examiner

VCSEL ARRAY FOR A DEPTH CAMERA

BACKGROUND

In order to suitably image a relatively large environment (e.g., a living room) with a time-of-flight (TOF) depth camera, a near infrared light source having high peak power and a fast modulation speed with sharp edge definition may be employed. In particular, the high peak power may provide enough light to suitably illuminate the entire environment. Furthermore, the fast modulation speed with sharp edge definition may provide accurate depth measurements of light returned from the environment.

SUMMARY

Various embodiments relating to a time-of-flight (TOF) depth camera including a vertical-cavity surface emitting laser (VCSEL) array device are disclosed. In one embodiment, a TOF depth camera includes a heat sink having a mounting surface, an illumination module mounted to the mounting surface, and an image sensor mounted to the mounting surface. The illumination module includes a printed circuit board (PCB), a VCSEL array device configured to generate illumination light to illuminate an image environment, and a driver configured to deliver an operating current to the VCSEL array device. The VCSEL array device and the driver are mounted to the PCB. The image sensor is configured to detect at least a portion of illumination light reflected from the image environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

This disclosure relates to a time-of-flight depth (TOF) depth camera including a vertical-cavity surface emitting laser (VCSEL) array device. More particularly, this disclosure relates to a TOF depth camera including a VCSEL array device and associated driver circuitry in a package that may facilitate a reduced operating temperature and lower inductance relative to other TOF depth camera configurations.

Figure 1:
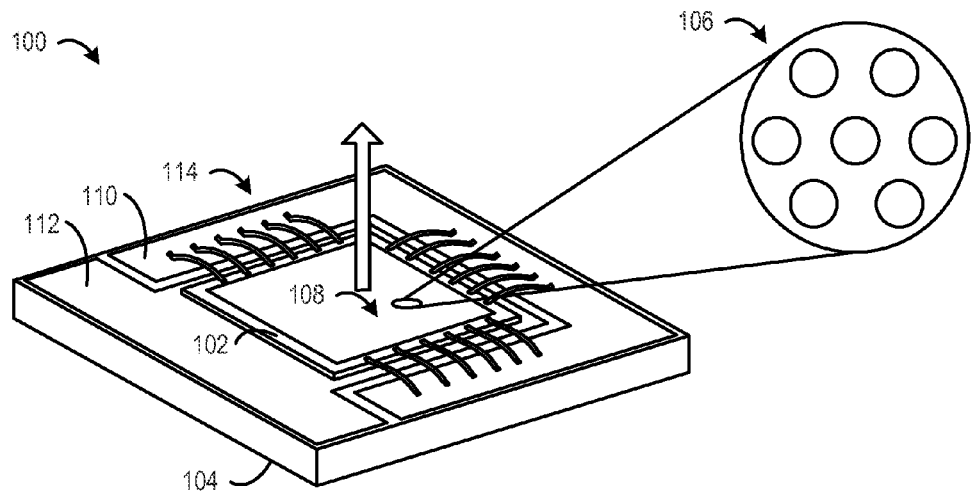
FIG. 1 shows a vertical-cavity surface emitting laser (VCSEL) array device in a chip-on-submount (CoS) configuration according to an embodiment of this disclosure.

FIG. 1 shows a VCSEL array device 100 in a chip-on-submount (CoS) configuration according to an embodiment of this disclosure. The VCSEL array device 100 includes a VCSEL chip 102 mounted on a submount 104. The VCSEL chip includes a plurality of VCSEL emitters 106. The plurality of VCSEL emitters 106 each emit coherent light independently and collectively contribute incoherently to a combined light beam. In particular, each emitter adds light intensity instead of field amplitude to the light beam. Accordingly, illumination homogenization characteristics may be increased (e.g., speckle suppression, reduction of diffraction artifacts and Moiré fringes), which can simplify a design of illumination optics that distribute laser light into a field of view with certain intensity distribution in a TOF depth camera.

The plurality of VCSEL emitters 106 may be arranged two dimensionally on a light emitting surface 108 of the VCSEL chip. The plurality of VCSEL emitters 106 emits light in a direction perpendicular to the light emitting surface 108. The plurality of VCSEL emitters 106 may be identical by design to simplify manufacturing of the VCSEL chip. Although, one or more VCSEL emitters may vary in size or shape without departing from the scope of this disclosure.

It will be understood that the plurality of VCSEL emitters may be arranged on the light emitting surface 108 in any suitable manner. In the illustrated example, the plurality of VCSEL emitters is arranged according to a hexagonal pattern that efficiently uses the surface area of the VCSEL chip. In another example, the plurality of VCSEL emitters may be arranged according to a different pattern. In another example, the plurality of VCSEL emitter may be arranged arbitrarily.

The VCSEL chip 102 is mounted to the submount 104 to facilitate surface mounting of the VCSEL chip on a printed circuit board (PCB) of a TOF depth camera. The submount 104 may have a coefficient of thermal expansion (CTE) that matches the VCSEL chip 102 to help provide highly reliable device operation. It will be understood that the submount may be made of any suitable thermally conductive material to disperse heat away from the VCSEL chip in order to promote lower operating temperatures. In one example the VCSEL chip includes gallium arsenide. In one example, the submount includes aluminum nitride. Other non-limiting examples of materials used in the submount include, but are not limited to, silicon and copper.

The submount 104 includes an anode 110 and a cathode 112 to which the VCSEL chip 102 may be electrically connected. In the illustrated embodiment, the anode 110 and the cathode 112 are positioned on a same side of the submount 104. The electrodes and/or the top surface of the submount may be metalized in order to electrically connect with the VCSEL chip. In particular, the VCSEL 102 chip may be bonded to the cathode 112, for example via a bonding process. Further, the plurality of VCSEL emitters that make up the array may be electrically connected in parallel to the anode 110 via a plurality of bonding wires 114. In some embodiments, the electrodes (e.g., anode and cathode) may be positioned on opposing sides of the submount. For example, in an example where the submount is made of copper, the VCSEL chip may be directly connected to cathode on the surface of the submount, and the VCSEL emitter array may be electrically connected to the anode on the opposing side of the submount.

A VCSEL array device may be implemented in a TOF depth camera over other illumination sources for several reasons. For example, the VCSEL array device may provide a higher power output at a higher conversion efficiency relative to a multiple light emitting diode (LED) light source. The high power output of the VCSEL array device may be useful for suitably illuminating a relatively large environment. In contrast, a multiple LED light source may not be capable of suitably illuminating a large environment. Moreover, the VCSEL array device may provide sharper edge definitions at high speeds of signal modulation relative to that of the multiple LED light source. The sharp edge definition may increase accuracy of depth detection. In contrast, the multiple LED light source may have reduced depth detection accuracy due to providing less sharp edge definitions.

In another example, multiple edge-emitting laser diodes (EELD) may be used as a light source in a TOF depth camera to achieve the desired peak power and modulation speed. However, because these lasers emit light along an edge, an arrangement of optics to suitably shape the emitted light may be more complex and relatively less robust than that of a VCSEL array device. In one particular example, an EELD configuration may have a pointing error of emitted light of 2 degrees due to mounting faces being in-plane with an emitting surface. On the other hand, a VCSEL array device having a planar surface, being mounted to a planar surface, and emitting light orthogonal to the mounting plane may have a pointing error approximately 0.5 degrees. The EELD configuration may require additional optics to correct the larger pointing error relative to the VCSEL configuration. Accordingly, packaging costs, and more particularly, optics costs of such a TOF depth camera may be higher than that of a TOF depth camera that includes a VCSEL array device.

Figure 2:
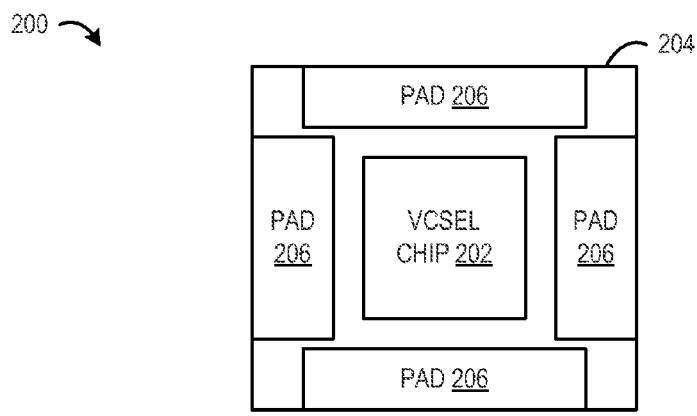
FIG. 2 schematically shows a top view of a VCSEL array device according to an embodiment of this disclosure.

FIG. 2 schematically shows a top view of a VCSEL array device 200 according to an embodiment of this disclosure. Components of the VCSEL array device 200 that may be substantially the same as those of the VCSEL array device 100 are identified in the same way and are described no further. However, it will be noted that components identified in the same way in different embodiments of this disclosure may be at least partly different.

Figure 5:
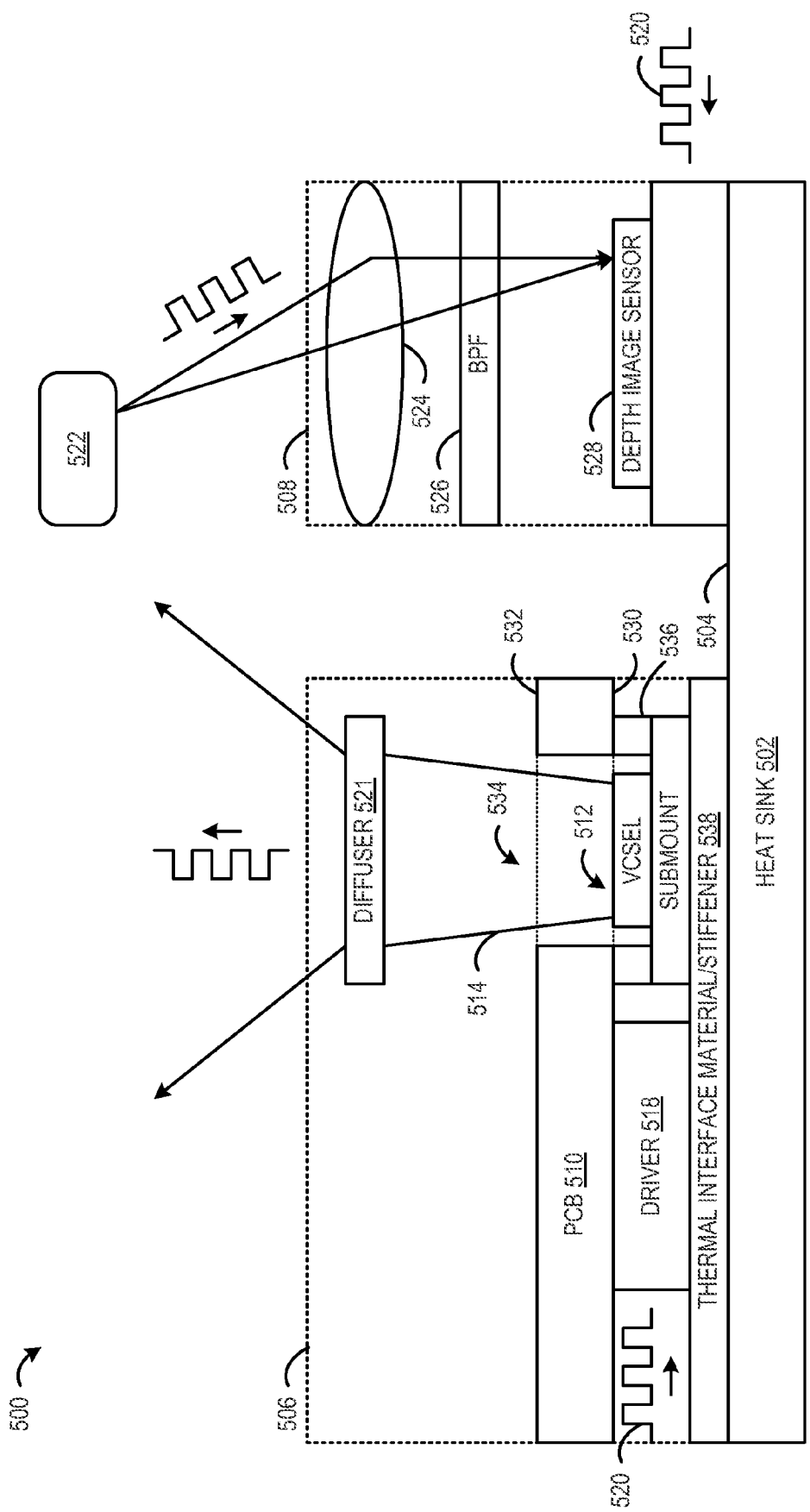
FIG. 5 schematically shows a TOF depth camera according to another embodiment of this disclosure.

The VCSEL array device includes a VCSEL chip 202 and a plurality of solder pads 206 mounted on a same side of a submount 204. The plurality of solder pads 206 may be used to electrically connect a PCB to the VCSEL chip 202 and/or physically connect the PCB to the submount 204. In particular, the plurality of solder pads 206 may facilitate mounting of the VCSEL array device 200 to an underside of a PCB. In other words, the VCSEL array device may be positioned behind the PCB, such that the VCSEL array device is between the PCB and a heat sink in a TOF depth camera. In such a configuration, the VCSEL array device may emit a light beam through an opening that extends through the PCB. An example of this configuration is shown in FIG. 5 and discussed in further detail below.

Figure 3:
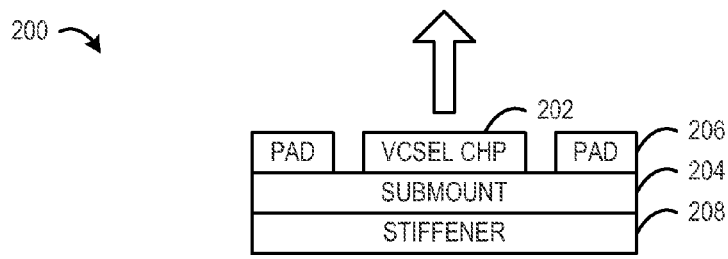
FIG. 3 schematically shows a cross-sectional view of the VCSEL array device of FIG. 2.

FIG. 3 schematically shows a cross-sectional view of the VCSEL array device 200 of FIG. 2. The VCSEL array device may optionally include a stiffener layer 208. The stiffener layer 208 may be positioned between the submount 204 and a mounting surface of a heat sink of a TOF depth camera. The optional stiffener layer may provide increased support in the case of a brittle submount. Further, the stiffener layer may facilitate thermal conductivity between the submount and a heat sink on which the VCSEL array device may be mounted. Further still, the stiffener layer may reduce bending stresses in the CoS package that results from thermal expansion mismatching of the CoS stack-up. It will be understood that the stiffener layer may include any suitable thermally conductive material to disperse heat from the VCSEL array device to the heat sink. In one example, the stiffener layer includes aluminum.

Figure 4:
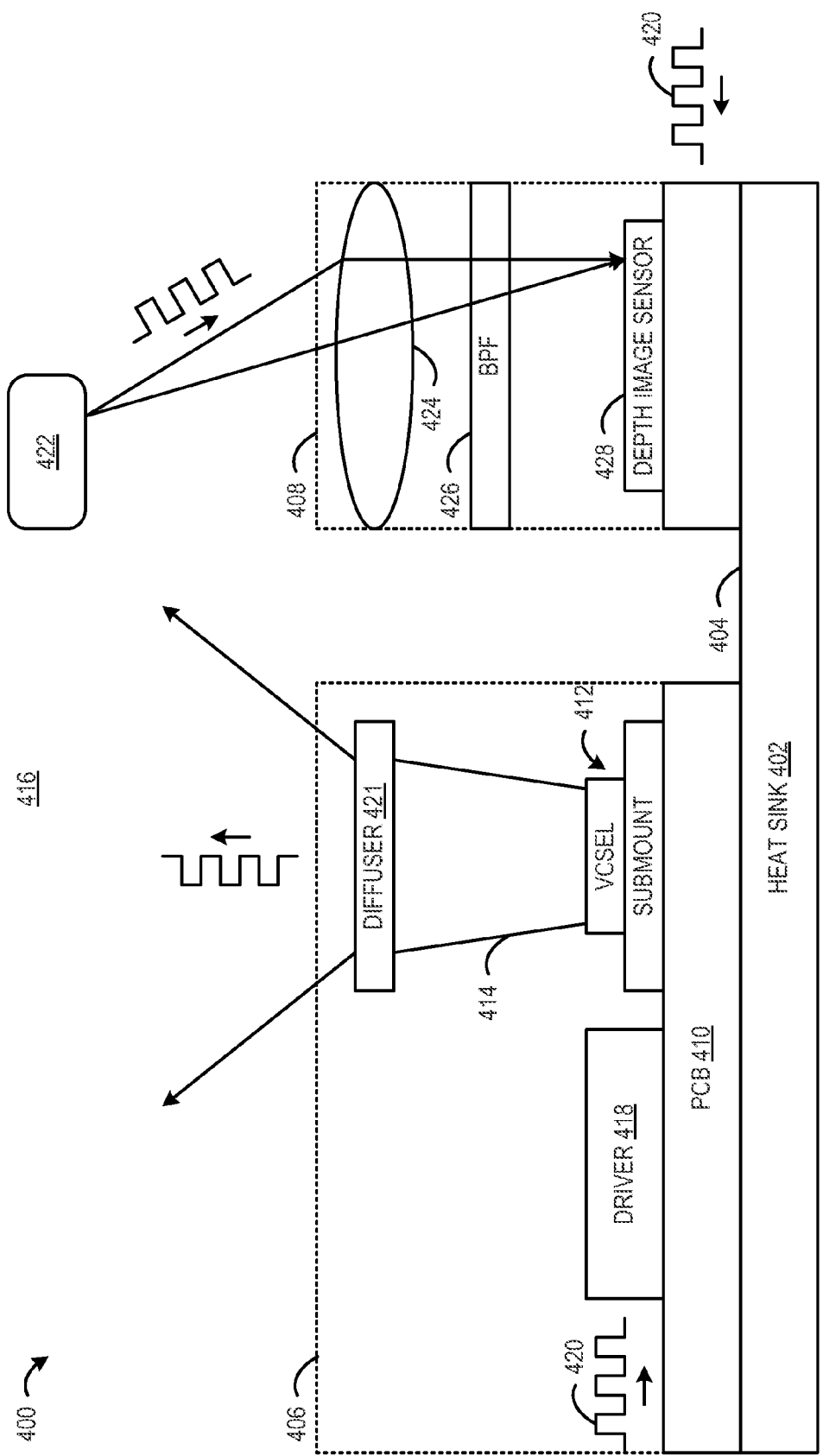
FIG. 4 schematically shows a time-of-flight (TOF) depth camera according to an embodiment of this disclosure.

FIG. 4 schematically shows a time-of-flight (TOF) depth camera 400 according to an embodiment of this disclosure. The TOF depth camera may be configured to collect image data from an image environment illuminated by illumination light. The TOF depth camera 400 includes a heat sink 402 having a mounting surface 404. An illumination module 406 and a depth sensor module 408 may be mounted to the mounting surface 404 of the heat sink 402. The illumination module 406 may be spaced away from the depth sensor module 408 on the mounting surface 404 to allow for air flow between the modules in order to dissipate heat from the modules to the heat sink. Moreover, the illumination module may be spaced a suitable distance away from the depth sensor module on the mounting surface to inhibit stray light from leaking from the illumination module to the depth sensor module. In some embodiments, a barrier may be positioned between the illumination module and the depth sensor module to prevent stray light from interfering with the depth sensor module.

The illumination module 406 includes a PCB 410, a VCSEL array device 412, a driver 418, and a diffuser 421. The PCB 410 may be mounted directly to the heat sink 402. It will be understood that the PCB may include any suitable material. For example, the PCB may be made of a material having a thermal conductivity greater than 2 Watts/(meters-Kelvin). In one example, the PCB includes a metal core for increased thermal conductivity relative to a PCB made strictly of less thermally conductive material, such as FR4. In other words, because the PCB is mounted directly to the heat sink, a PCB having higher thermal conductivity may increase heat transfer to the heat sink relative to a PCB having a lower thermal conductivity.

The VCSEL array device 412 may be mounted to a surface of the PCB 410 that opposes a surface that is mounted to the heat sink 402. The VCSEL array device 412 may be configured to generate illumination light 414 to illuminate an environment 416. As discussed above, the VCSEL array device may provide high peak power output at a high conversion efficiency to suitably illuminate the environment. Moreover, the VCSEL array device may produce sharp edge definitions at high speeds of signal modulation that may increase depth detection accuracy. In such a configuration edge sharpness may be related to an inductance of the electronic components of the illumination module. In particular, a reduction in inductance of the illumination module results in an increase in edge sharpness. Accordingly, a driver 418 may be mounted to the PCB 410 and electrically connected to the VCSEL array device 412 via the PCB. By mounting the driver on the PCB with the VCSEL array device, a distance between the two components may be reduced relative to a configuration where a driver is mounted separately on the heat sink. Accordingly, inductance may be reduced relative to the configuration where the driver is mounted separately.

In one example, the VCSEL chip is made of gallium arsenide and the driver is made of silicon. As such, the VCSEL chip is electrically connected to the driver via the PCB. In some embodiments, the driver may be fabricated from gallium arsenide, and the driver and the VCSEL chip may be mounted on the same submount. In such a configuration, the CoS may have an increased operating temperature and a reduced inductance relative to the configuration where the VCSEL chip and the driver are electrically connected via the PCB.

The driver 418 may be configured to deliver an operating current to the VCSEL array device to power the VCSEL array device. In particular, the driver 418 may be configured to receive a modulated input signal 420. The driver may act as a constant current source to deliver the modulated input signal to the VCSEL array device. The VCSEL array device may generate illumination light as a pulse train that corresponds to the modulated input signal. In one example, the VCSEL array device generates illumination light as a pulse train of at least 100 microsecond pulses repeating every millisecond. In another example, the pulse train may include pulses ranging between 100-130 microseconds repeating every millisecond. In one particular example, the VCSEL array device generates illumination light as a pulse train of 120 microsecond pulses repeating every millisecond. It will be understood that the VCSEL array device may generate illumination light at any suitable modulation speed without departing from the scope of this disclosure.

The VCSEL array device 412 may emit an incoherent illumination light beam through the diffuser 421 of the illumination module 406 to diffuse illumination light to the environment 416. The diffuser spreads illumination light throughout the environment to make efficient use of the optical power of the VCSEL array device. The incoherent light provided by the VCSEL array device may have suitable illumination homogenization characteristics (e.g., speckle suppression, reduction of diffraction artifacts and Moiré fringes as well) that may simplify illumination optics designs (e.g., diffuser 421) for distributing laser light into the environment.

Light provided to the environment 416 by the illumination module 406 may be reflected off objects in the environment, such as object 422. The depth sensor module 408 may be configured to receive light returned from the environment 416 including light reflected off of the object 422. The depth sensor module 408 includes one or more lenses 424, a band-pass filter (BPF) 426, and an image sensor 428. The one or more lenses 424 may be configured to direct the returned light through the band-pass filter 426 and to the image sensor 428. The image sensor 428 may be mounted to the heat sink 402. The image sensor 428 may be configured to detect at least a portion of illumination light reflected from the image environment. In particular, each sensor pixel may act as a ranging unit by mixing the incoming light (e.g., mainly modulated laser light reflected from the environment) generated signal at the pixel with the modulated input signal 420, yielding information of phase shift (or time delay) of reflected light, and therefore the distance from the image sensor 428 to the object 422 in the environment 416.

It will be understood that a low wavelength shift over temperature of the VCSEL array device (typically 0.06 nm/K for VCSEL compared to 0.3 nm/K for EELD at near IR wavelengths) may be used advantageously with the band-pass filter 426 to achieve a high signal to noise ratio (SNR) at the depth image sensor while operating in a wide range of temperatures. By matching a wavelength of the VCSEL array device and the band-pass filter an illumination power level may be reduced while maintaining a desired sensor SNR. Such a configuration may also apply to TOF depth cameras having a plurality of imaging sensor modules used to determine depth information.

FIG. 5 schematically shows a TOF depth camera 500 according to another embodiment of this disclosure. Components of the TOF depth camera 500 that may be substantially the same as those of the TOF depth camera 400 are identified in the same way and are described no further. However, it will be noted that components identified in the same way in different embodiments of this disclosure may be at least partly different.

The TOF depth camera 500 includes an illumination module 506 where a VCSEL array device 512 and a driver 518 are mounted between a heat sink 502 and a PCB 510. In particular, the PCB 510 has a first side 530 oriented to face a mounting surface 504 of the heat sink 502, a second side 532 that opposes the first side, and an opening 534 extending through the PCB between the first side and the second side. The VCSEL array device 512 may be mounted to the first side 530 of the PCB 510 via a plurality of soldering pads 536. The VCSEL array device 512 may be configured to emit the illumination light through the opening 534.

Further, an illumination module 506 may include a thermal interface material and/or stiffener layer 538 mounted to the mounting surface 504 of the heat sink 502. The VCSEL array device 512 and a driver 518 may be mounted to the thermal interface material and/or stiffener layer 538. The thermal interface material and/or stiffener layer 538 may provide an efficient thermal connection between these components and the heat sink.

The TOF depth camera 500 may produce a relatively lower amount of radiated emissions than a TOF depth camera utilizing an EELD, as the VCSEL device has a relatively low loop inductance due to a low profile created by a flat mounting of the VCSEL array device between the PCB and the heat sink. In contrast, an EELD may have a higher profile to allow edge illumination to be emitted. Moreover, a natural Faraday cage may be created by the VCSEL array device being sandwiched between the PCB and the heat sink, which also may help to reduce radiated emissions of the VCSEL array device.

Figure 6:
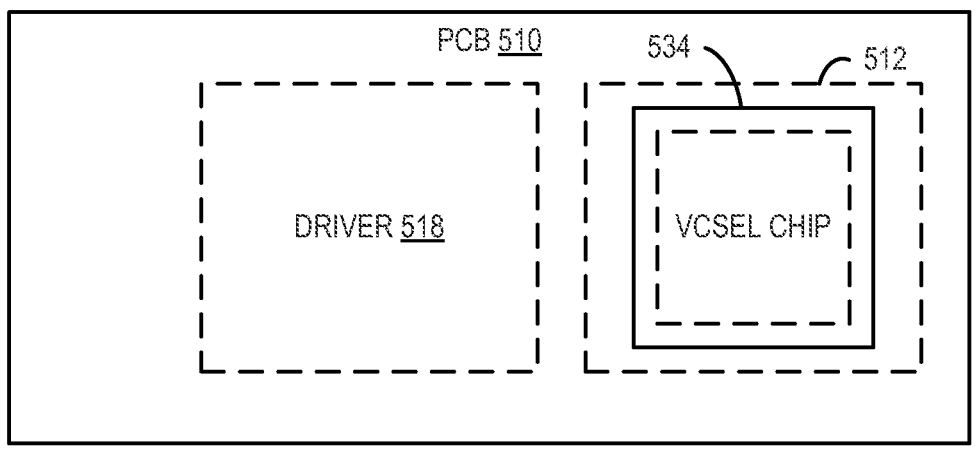
FIG. 6 schematically shows a top view of an illumination module of the TOF depth camera of FIG. 5

FIG. 6 schematically shows a top view of the illumination module 506 of the TOF depth camera 500 of FIG. 5. The driver 518 and the VCSEL array device 512 may be positioned below the PCB 510. The opening 534 may be sized large enough to allow light emitted by the VCSEL array to shine through the opening without interference. Moreover, the opening may be sized large enough to not interfere with the VCSEL chip or any bonding wires.

Such a configuration may provide a more efficient thermal connection between the heat sink and the VCSEL array device relative to the TOF depth camera 400 shown in FIG. 5. In particular, heat from the VCSEL array device may be transferred to the heat sink without flowing through the PCB. The increased heat transfer in turn reduces a laser junction temperature that increases an operating efficiency of the VCSEL array device. Moreover, this configuration allows for flexibility in a layout of the PCB that reduces loop inductance of the VCSEL array device. Because heat is not transferred to the heat sink through the PCB, a standard PCB material (e.g., FR4) can be used instead of the more expensive thermally conductive PCB material. For example, the PCB may be made of a material having a thermal conductivity less than 2 Watts/(meters-Kelvin).

Figure 7:
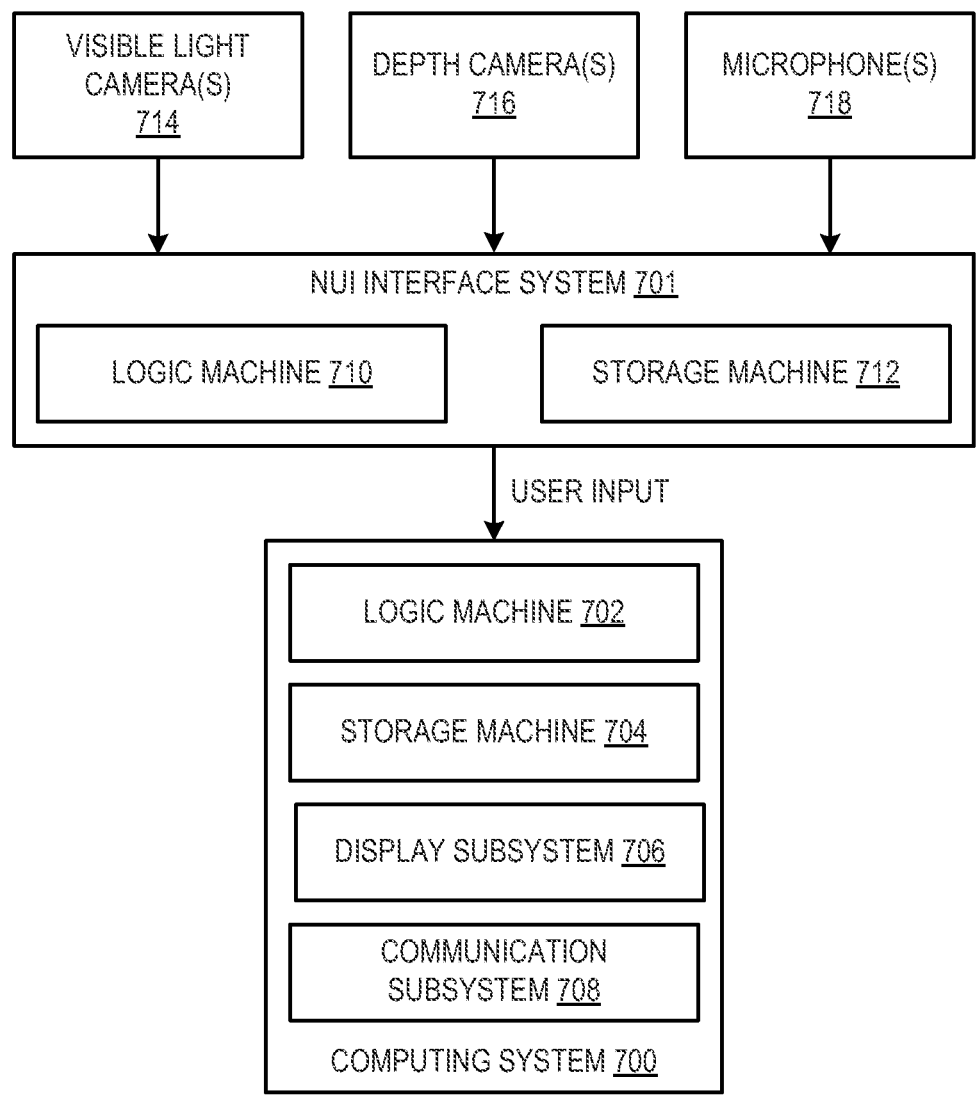
FIG. 7 shows a computing system and a natural user input (NUI) interface system according to an embodiment of this disclosure.

As mentioned above, the embodiments described herein may be used as a natural user input device for a computing system. FIG. 7 schematically shows a non-limiting embodiment of a computing system 700 that may be coupled to a natural user input device that includes a TOF depth camera. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices.

Computing system 700 includes a logic machine 702 and a storage machine 704. Computing system 700 may optionally include a display subsystem 706, a communication subsystem 708, and/or other components not shown in FIG. 7.

Logic machine 702 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 704 includes one or more physical devices configured to hold instructions executable by the logic machine to implement the methods and processes described herein. When such methods and processes are implemented, the state of storage machine 704 may be transformed—e.g., to hold different data.

Storage machine 704 may include removable and/or built-in devices. Storage machine 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.), as opposed to being stored in a storage medium.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic machine 702 executing instructions held by storage machine 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 706 may be used to present a visual representation of data held by storage machine 704. This visual representation may take the form of a graphical user interface (GUI). As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, communication subsystem 708 may be configured to communicatively couple computing system 700 with one or more other computing devices. Communication subsystem 708 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 700 to send and/or receive messages to and/or from other devices via a network such as the Internet.

NUI interface system 701 may be configured to provide user input to computing system 700. More particularly, the NUI interface system may include a depth camera 716 configured to generate depth information about an object based upon image information generated by an image sensor from detected illumination light and to output the depth information to the computing device 700. To this end, the NUI interface system includes a logic machine 710 and a storage machine 712. To detect the user input, the NUI interface system receives low-level input (e.g., signal) from an array of sensory components, which may include one or more visible light cameras 714, depth cameras 716, and microphones 718. Other example NUI componentry may include one or more infrared or stereoscopic cameras; a head tracker, eye tracker, accelerometer, and/or gyroscope for motion detection and/or intent recognition; as well as electric-field sensing componentry for assessing brain activity. In some embodiments, the NUI interface system may comprise or interface with one or more user-input devices such as a keyboard, mouse, touch screen, or game controller.

The NUI interface system processes the low-level input from the sensory components to yield an actionable, high-level input to computing system 700. Such action may generate corresponding text-based user input or other high-level commands, which are received in computing system 700. In some embodiments, NUI interface system and sensory componentry may be integrated together, at least in part. In other embodiments, the NUI interface system may be integrated with the computing system and receive low-level input from peripheral sensory components.

In one particular example, a TOF depth camera includes a logic machine and a storage machine holding instructions executable by the logic machine to generate depth information about an object based upon image information generated by an image sensor from detected illumination light and to output the depth information to a computing device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A time-of-flight (TOF) depth camera configured to collect image data from an image environment illuminated by illumination light, the TOF depth camera comprising:
   a heat sink having a mounting surface;
   an illumination module mounted to the mounting surface of the heat sink, the illumination module including
      a printed circuit board (PCB),
      a vertical-cavity surface emitting laser (VCSEL) array device configured to generate illumination light to illuminate the image environment, the VCSEL array device being mounted to the PCB, the VCSEL array device including a VCSEL chip, a submount including an anode and a cathode positioned on a same side of the submount, and a stiffener layer, wherein the VCSEL chip is bonded to the cathode and electrically connected to the anode via a plurality of bonding wires, and wherein the stiffener layer is positioned between the submount and the mounting surface of the heat sink, and
      a driver configured to deliver an operating current to the VCSEL array device, the driver being mounted to the PCB and electrically connected to the VCSEL array device via the PCB; and
   an image sensor mounted to the mounting surface of the heat sink, the image sensor configured to detect at least a portion of illumination light reflected from the image environment.

2. The TOF depth camera of claim 1, wherein the PCB is mounted between the heat sink and the VCSEL array device.

3. The TOF depth camera of claim 2, wherein the PCB is made of a material having a thermal conductivity greater than 2 W/(m-K).

4. The TOF depth camera of claim 1, wherein the PCB has a first side oriented to face the mounting surface of the heat sink, a second side that opposes the first side, and an opening extending through the PCB between the first side and the second side, and wherein the VCSEL array device is mounted to the first side of the PCB and emits the illumination light through the opening.

5. The TOF depth camera of claim 4, wherein the submount has a first side, wherein the VCSEL array device includes a plurality of soldering pads, and wherein the VCSEL chip and the plurality of soldering pads are coupled between the first side of the submount and the first side of the PCB.

6. The TOF depth camera of claim 4, wherein the PCB is made of a material having a thermal conductivity less than 2 W/(m-K).

7. The TOF depth camera of claim 1, wherein the VCSEL array device generates illumination light as a pulse train of at least 100 microsecond pulses repeating every millisecond.

8. A time-of-flight (TOF) depth camera configured to collect image data from an image environment illuminated by illumination light, the TOF depth camera comprising:
   a heat sink having a mounting surface;
   an illumination module mounted to the mounting surface of the heat sink, the illumination module including
      a printed circuit board (PCB) having a first side oriented to face the mounting surface of the heat sink, a second side that opposes the first side, and an opening extending through the PCB between the first side and the second side,
      a vertical-cavity surface emitting laser (VCSEL) array device configured to generate illumination light to illuminate the image environment, the VCSEL array device being mounted to the first side of the PCB and emitting the illumination light through the opening, the VCSEL array device including a VCSEL chip, a submount including an anode and a cathode positioned on a same side of the submount, and a stiffener layer, wherein the VCSEL chip is bonded to the cathode and electrically connected to the anode via a plurality of bonding wires, and wherein the stiffener layer is positioned between the submount and the mounting surface of the heat sink, and
      a driver configured to deliver an operating current to the VCSEL array device, the driver being mounted to first side of the PCB and electrically connected to the VCSEL array device via the PCB; and
   an image sensor mounted to the mounting surface of the heat sink, the image sensor configured to detect at least a portion of illumination light reflected from the image environment.

9. The TOF depth camera of claim 8, wherein the submount has a first side, wherein the VCSEL array device includes a plurality of soldering pads, and wherein the VCSEL chip and the plurality of soldering pads are coupled between the first side of the submount and the first side of the PCB.

10. The TOF depth camera of claim 8, wherein the PCB is made of material having a thermal conductivity less than 2 W/(m-K).

11. The TOF depth camera of claim 8, wherein the VCSEL array device generates illumination light as a pulse train of at least 100 microsecond pulses repeating every millisecond.

12. A time-of-flight (TOF) depth camera configured to collect image data from an image environment illuminated by illumination light, the TOF depth camera comprising:
   a heat sink having a mounting surface;
   an illumination module mounted to the mounting surface of the heat sink, the illumination module including
      a printed circuit board (PCB) having a first side oriented to face the mounting surface of the heat sink, a second side that opposes the first side, and an opening extending through the PCB between the first side and the second side,
      a vertical-cavity surface emitting laser (VCSEL) array device configured to generate illumination light to illuminate the image environment, the VCSEL array device being mounted to the first side of the PCB and emitting the illumination light through the opening, the VCSEL array device includes a VCSEL chip, a submount including an anode and a cathode positioned on a same side of the submount, and a stiffener layer, wherein the VCSEL chip is bonded to the cathode and electrically connected to the anode via a plurality of bonding wires, and wherein the stiffener layer is positioned between the submount and the mounting surface of the heat sink, and a driver configured to deliver an operating current to the VCSEL array device, the driver being mounted to the first side of the PCB and electrically connected to the VCSEL array device via the PCB;

an image sensor mounted to the mounting surface of the heat sink, the image sensor configured to detect at least a portion of illumination light reflected from the image environment;

a storage machine holding instructions; and a logic machine configured to execute the instructions to
generate depth information about the object based upon image information generated by the image sensor from detected illumination light, and
output the depth information to a computing device.

13. The TOF depth camera of claim 12, wherein the submount has a first side, wherein the VCSEL array device further includes a plurality of soldering pads, and wherein the VCSEL chip and the plurality of soldering pads are coupled between the first side of the submount and the first side of the PCB.

* * * * *